Aug. 27, 1940.         C. A. MORGILLO         2,212,527
JAR LIFTER
Filed March 4, 1939
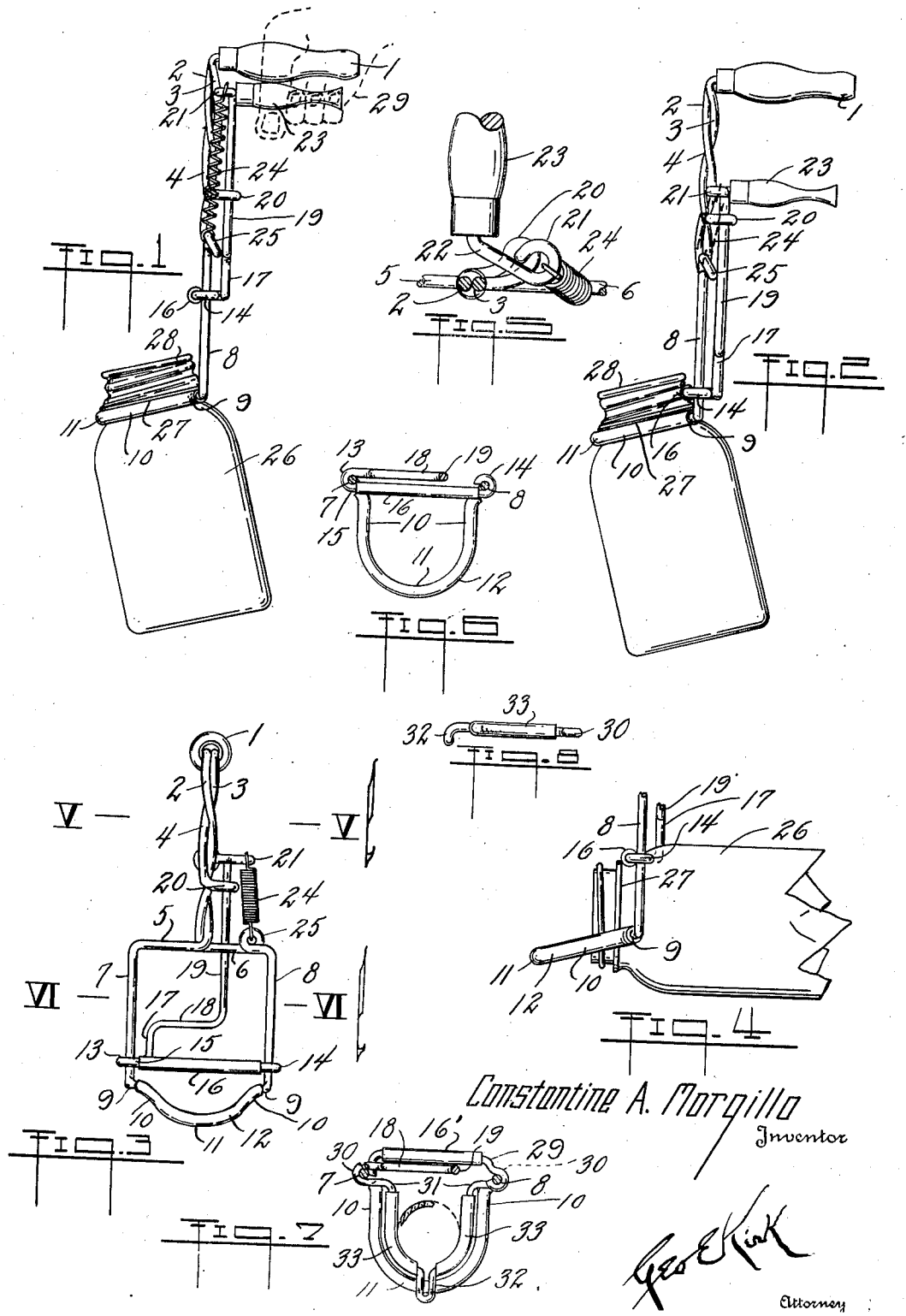
Constantine A. Morgillo
Inventor
Geo E Kirk
Attorney Patented Aug. 27, 1940

2,212,527

UNITED STATES PATENT OFFICE 2,212,527

JAR LIFTER

Constantine A. Morgillo, Toledo, Ohio

Application March 4, 1939, Serial No. 259,776

2 Claims. (Cl. 294—34)

This invention relates to attachable handle means, especially for engaging and lifting articles as containers or jars.

This invention has utility when incorporated in loop or bar-engageable handle directed grappling means especially for placing or removing fruit jars as in sterilizing and canning operations.

Referring to the drawing:

Fig. 1 is a side elevation having an embodiment of the invention in fruit jar lifting position;

Fig. 2 is a view similar to Fig. 1 in which the device has been allowed to lock with the engaged jar;

Fig. 3 is a view of the device from the left of Fig. 2 and clear of the fruit jar;

Fig. 4 is a fragmentary view of the device in grapple position for a jar on its side;

Fig. 5 is a section on the line V—V, Fig. 3, looking down on the offset and guide toward the bar;

Fig. 6 is a view on the line VI—VI, Fig. 3, looking at the U-shaped seat or loop and holding bar;

Fig. 7 is a view similar to Fig. 6 in which the slide bar is offset away from the U-seat instead of theretoward as in Fig. 6 and this Fig. 7 additionally shows in plan an auxiliary attachment forming a smaller seat; and Fig. 8 is a side view of the auxiliary seat device shown in plan in Fig. 7.

Main handle 1 is shown as having wires 2, 3, twisted therefrom to form portion 4 and thence with oppositely directed portions 5, 6, forming a clearance side with drop portions 7, 8, therefrom having inward offsets 9 to provide an opening between legs 10, having return bend 11 as a U-shaped seat which may be covered with protective hose 12. The portions 5, 6, 7, 8, constitute approximately three sides of a rectangle, with the sides 7, 8, as guides for terminal eyes 13, 14, of connecting bar 15, herein covered with cushioning hose 16. The handle 1 is fixed with the guides 7, 8.

From the eye 13 there abruptly rises short leg 17 with angle portion 18 to riser portion 19, extending through eye 20 in the wire 3 to eye 21 having extension 22 therefrom to secondary handle 23 parallel to and adjacent primary handle or grip portion 1. The second handle 23 is fixed with the bar 16. There is thus in the handle portions 1, 23, a sectional grip. This grip is normally held in spaced relation, that is, with the bar 15 toward the loop seat 10, 11, by helical spring 24 from the eye 21 to eye 25 in the portion 6 of the rectangular clearance region.

This rectangular clearance region 5, 6, 7, 8, is such that the one hand gripping of this grapple at the handles 1, 23, may hold the bar 15 toward the portions 5, 6, of the rectangle with clearance therebelow so that the U-portion as open toward the grip or offset may be located as to fruit jar 26 near adjacent shoulder 27 and under the top engaging screw thread or closure holding portions 28. As thus drawn into position the portions 9 ride along the shoulder 27 adjacent the thread portion 28 so that the jar 26 may be readily lifted thereby. However, should there be occasion to stabilize the jar or article lifted, hand 29 of the operator may be sufficiently open to allow the grip portion 23 to respond to the action of the spring 24 and thus draw the bar 15 into position along the guides 7, 8, and thus abut threaded or offset portion 28 of the jar 26 or be in position against the seat to close the opening between the legs of the U-portion or loop. In such position (Fig. 2) the jar is positively held against any tilting or other shifting as for special holding, emptying, or otherwise.

In the event the article to be lifted has its open mouth in upward or tilted position or is lying on its side (Fig. 4) it is not necessary to swing the grips into a position adjacent the scalding water, if there be a sterilizing operation in progress. It is only necessary to manipulate the grips in the way for the upright jar. However, instead of the loop being parallel or adjacent the shoulder 27 to ride into position at the neck portion, the portions 7, 8, are thrust downward forward of the open end sufficiently far to bring the inwardly projecting portions 9 below the major diameter portion of the open end of the jar. This narrowed portion as then drawn upward engages the jar shoulder below the mid-portion. The releasing of the secondary grip 23 allows the bar 15 to ride to locking position in opposition to the engaging portion of the U-seat free ends. As thus held, the engaged container or jar may be tilted to spill any contents therefrom and then righted either outside or within the container for sterilization.

It is thus seen that this one-hand-operable jar-lifter has three effective grappling portions (Figs. 1, 2, 4) and is readily operable and readily released by this single hand control in directing the jar or article lifted in the placement or replacement as may be desired, whether for emptying or filling.

In the glass container art, the general term "wide mouthed ware," when directed toward fruit jars of the Mason type, is quite standard as to the mouth or neck, whether the jar be pint, quart, or two quarts. Accordingly, this tool with a loop 10, 11, 10, is of a general range suitable for that use. In the instance in which it is desired to use the tool on a somewhat larger necked article, the offset from the guides 7, 8, for the closure bar, instead of being toward the loop, 10, 11, 10, may be away from it as by bar 16' (Fig. 7). This bar 16' as thus offset permits a larger clearance way from the loop back to the bar.

In the "wide mouthed ware" group of containers, besides fruit jars, there is the class of milk bottles and even nursing bottles, with a dimension usually less than that for the fruit jars. A reduction of the effective loop is shown by the attachable device (Fig. 7). In this setup, the portions of the rods 7, 8, which are adjacent the offsets 9 may be engaged by hook portions 30 of the attachable seat having side portions 31 spaced by an intermediate claw or hook 32. This claw or hook 32 may engage over the mid-portion of the cushion 12 near the return bend of this U-seat. Furthermore, this attachable seat device for increased range, that is, in reduced size of articles to be grappled, may be thus effective, and to such end the arms 31 may carry cushioning means 33. This device may be readily attached by snapping the hook 32 over the return bend portion of the U-major seat as the hook portions 30 are adjacent the offsets 9. When it is desired to handle larger ware or articles than that of this supplemental seat device, it is only necessary to unhook the claw 32 and lift the device clear, and then the major seat of the U is in position for functioning.

What is claimed and it is desired to secure by United States Letters Patent is:

1. A hand grip, an offset therefrom terminating in a seat positionable by the grip to engage an article on opposite sides for directly lifting the article, means for adjusting the range of said seat embodying an attachable supplemental seat, and a holding bar guided by and shifted along the offset relatively to the grip for supplementing the dimension range in engaging the article.

2. A lifter tool comprising an open loop section, guide means extending from and rigid with the section, a spanning bar mounted on and directed by said guide means in shifting toward and from loop closing position, and parallel handle means one connected to the guide means and the other having a connection extending therefrom cooperating with the guide means and fixed with the bar.

CONSTANTINE A. MORGILLO.